United States Patent [19]

Belaga et al.

[11] Patent Number: 5,482,415
[45] Date of Patent: Jan. 9, 1996

[54] SPINDLE HEAD OF METAL-WORKING MACHINE

[75] Inventors: Vladimir B. Belaga; Levon M. Abramian; Igor L. Fux; Gennady S. Chevrenidi; Sergei G. Popov, all of Tashkent, Uzebkistan

[73] Assignee: Maloe predpriyatie "Puler Ko., Ltd.", Moscow, Russian Federation

[21] Appl. No.: 244,599

[22] PCT Filed: Apr. 2, 1992

[86] PCT No.: PCT/RU92/00067

§ 371 Date: Jun. 2, 1994

§ 102(e) Date: Jun. 2, 1994

[87] PCT Pub. No.: WO93/19877

PCT Pub. Date: Oct. 14, 1993

[51] Int. Cl.⁶ .................................................. B23C 1/02
[52] U.S. Cl. ........................ 409/200; 409/204; 409/231
[58] Field of Search .................................. 409/199, 200, 409/201, 204, 216, 231

[56] References Cited

U.S. PATENT DOCUMENTS 3,803,981 4/1974 Allgeyer .
4,789,278 12/1988 Dexter et al. ............................ 409/200
5,197,836 3/1993 Crivellin .................................. 409/200

FOREIGN PATENT DOCUMENTS 2206689 6/1974 France .
500919 3/1976 U.S.S.R. ................................. 409/231
515595 8/1976 U.S.S.R. .
556898 5/1977 U.S.S.R. ................................. 409/200
1495019 7/1989 U.S.S.R. .

Primary Examiner—Dainel W. Howell
Attorney, Agent, or Firm—Collard & Roe

[57] ABSTRACT

A spindle head has a housing accommodating a faceplate rotatable in a circular slideway. A spindle quill is mounted in the faceplate eccentrically to its axis of rotation and rotatably in a circular slideway. The spindle head also has respective turning mechanisms of the faceplate and the spindle quill, and transmitters of their angular position which include rotors and stators interacting therewith and associated with the machine control system through a cable. The rotor of the faceplate angular position transmitter is connected to the faceplate through a rod accommodated in the hollow space of the spindle quill turning mechanism, and the stator of the transmitter is secured on the spindle head housing. The rotor of the spindle quill angular position transmitter is connected to the spindle quill through a rod accommodated in a hollow layshaft, and the stator of the transmitter with the cable end secured thereon is mounted on the faceplate. The opposite cable end is connected to the machine control system through a transfer device. The drive shaft of the spindle quill turning mechanisms is accommodated inside a double-gear cluster that interconnects the spindle to its rotation drive.

3 Claims, 6 Drawing Sheets

5,482,415

SPINDLE HEAD OF METAL-WORKING MACHINE

FIELD OF THE INVENTION

The invention relates to the machine-tool building and more specifically to a spindle head of a metal-cutting machine.

PRIOR ART

Known in the prior art is a spindle head (SU, A, 515,595) comprising a spindle installed in a housing, a device for regulating the position of the spindle in a plane perpendicular to the axis thereof and made in the form of portions eccentrically arranged one in the other and provided with circular guideways one of which is installed in the housing, while the other one carries a spindle arranged therein. The value of eccentricity in the arrangement of the portions is equal to the value of eccentricity in the arrangement of the spindle, and the portions are provided with mechanisms and drives for their turning. This spindle head suffers from an insufficient rigidity and therefore cannot be used in the NC machine-tools for providing a high operational precision.

Also known in the prior art is a spindle head (SU, A, 1,495,019) comprising a spindle installed in a housing, a device for regulating the position of the spindle in a plane perpendicular to the axis thereof and made in the form of a spindle quill and a faceplate eccentrically arranged one in the other one and provided with a circular guideways. The faceplate is installed in the housing and the spindle quill carries a spindle arranged eccentrically therein, and the value of eccentricity in the arrangement of the faceplate and the spindle quill is equal to the value of eccentricity in the arrangement of the spindle. The faceplate and the spindle quill are provided with mechanisms for their turning, as well as with drives and angular position transmitters. The kinematic chain connecting the spindle with the drive is provided with a hollow double-gear cluster and a driving shaft of the spindle quill turning mechanism is arranged inside the double-gear cluster. The main motion drive comprises a shaft mounted on the faceplate coaxially with the spindle quill. Besides, readings of angular displacements of the faceplate and the spindle quill are provided with the aid of rotary angular position transmitters.

With the spindle head of such a design, the transmitters can be arranged only on axes of appropriate driving motors or on the shafts kinematically associated with the spindle quill and the faceplate, therefore a high-precision control of the position of a movable link cannot be ensured because of an adverse effect of the backlash in the transmission. Arrangement of the faceplate angular position transmitter by way of a direct connection of the transmitter rotor to the faceplate is impossible because of the presence in this place of the hollow double-gear cluster and the shaft of the turning mechanism, while arrangement of the spindle quill angular position transmitter is impossible because of the presence in this place of the main motion drive shaft.

DISCLOSURE OF THE INVENTION

The present invention is essentially aimed at providing such an arrangement of rotors and stators of the faceplate and spindle quill angular position transmitters in the spindle head of a metal-working machine-tool which will ensure a minimal backlash in the connection of a drive of the spindle quill turning mechanism and a direct measurement of the angular position of the faceplate and the spindle quill.

This aim is attained by that in a spindle head of a metal-working machine-tool comprising a housing which internally accommodates a faceplate installed for rotation on a circular slideway and which in turn internally accommodates a spindle quill installed eccentric to the axis of rotation on a circular slideway for rotation and carrying therein a spindle, turning mechanisms of the faceplate and the spindle quill, angular position transmitters of the faceplate and the spindle quill comprising rotors and stators interacting therewith, and connected with a control system through the medium of a cable, and a driving shaft of the spindle quill turning mechanism is arranged inside a hollow double-gear cluster kinematically associating the spindle with its rotary drive, according to the invention, a driving shaft of the spindle quill turning mechanism is made hollow and internally accommodates a rod one end of which is connected with the faceplate and the other end is connected with the rotor of the faceplate angular position transmitter the stator of which is secured on the housing, and the spindle head is provided with an additional hollow shaft kinematically associated with the spindle and with the double-gear cluster internally accommodating a rod one end of which is connected with the spindle quill while the other end is connected with the rotor of the spindle quill angular position transmitter the stator of which together with one end of the cable secured thereon is installed on the faceplate, while the other end of the cable is associated with the control system through a transfer device.

With the spindle head of such a design, the faceplate and spindle quill angular position transmitters are installed on the axes of appropriate eccentircities which ensures a direct fixed coupling of their rotors with the parts the position of which is measured. As a result, the joint becomes backlash-free and the transmitter signal completely corresponds to a measured axis which makes it possible to sharply increase the positioning accuracy on this axis and consequently to step up the accuracy of the spindle head as a whole.

It is advantageous that the housing be made of a built-up construction and its both portions be associated with each other by means of cross-shaped keys disposed in mutually perpendicular slots provided in each portion of the housing and one portion of the housing may internally accommodate the faceplate and the other portion may suitably be provided with a spindle quill turning mechanism internally accommodating a worm wheel fitted on its driving shaft and meshed with a worm, and in addition, it is desirable that the spindle quill turning mechanism be provided with a sleeve encompassing the worm wheel and disposed with an offset of its axis relative to the axis of the worm wheel, and installed for turning thereabout.

This makes it possible to automatically adjust and compensate the backlash in the drive kinematic chain, including the backlash appearing in the process wear, by way of an automatic displacement of one portion of the housing with the worm at right angles to the axis of the worm wheel accomplished by turning the spring-loaded sleeve. As a result, the backlash in the worm drive is reduced to a minimum envisaged by the precision of manufacture and therefore said backlash has no effect on operation of the turning mechanism drive which substantially enhances reliability of the spindle head.

It is preferable that the transfer device be made in the form of a cable winding mechanism comprising two coaxially installed reels provided with helical flutes of different direction, one of said reels may suitably be secured on the faceplate and the other one may be made hollow and installed in the housing, and also a planetary transmission mounted in the hollow reel, a spring-loaded tension pulley connected to the planetary transmission carrier with a bar installed thereon and provided with reciprocating runners adapted for cooperation with limit switches disposed in slots made in the hollow reel.

This solves the problem of electrically connecting the spindle quill angular position transmitter with the control system without using current pick-off devices due to which the faceplate can be turned through an angle exceeding 360° with retention of this connection, thereby improving reliability of the spindle head.

BRIEF DESCRIPTION OF THE DRAWING

The invention will now be described in greater detail with reference to a specific embodiment thereof, taken in conjunction with the accompanying drawings, wherein.

BEST MODE OF CARRYING OUT THE INVENTION

Figure 1:
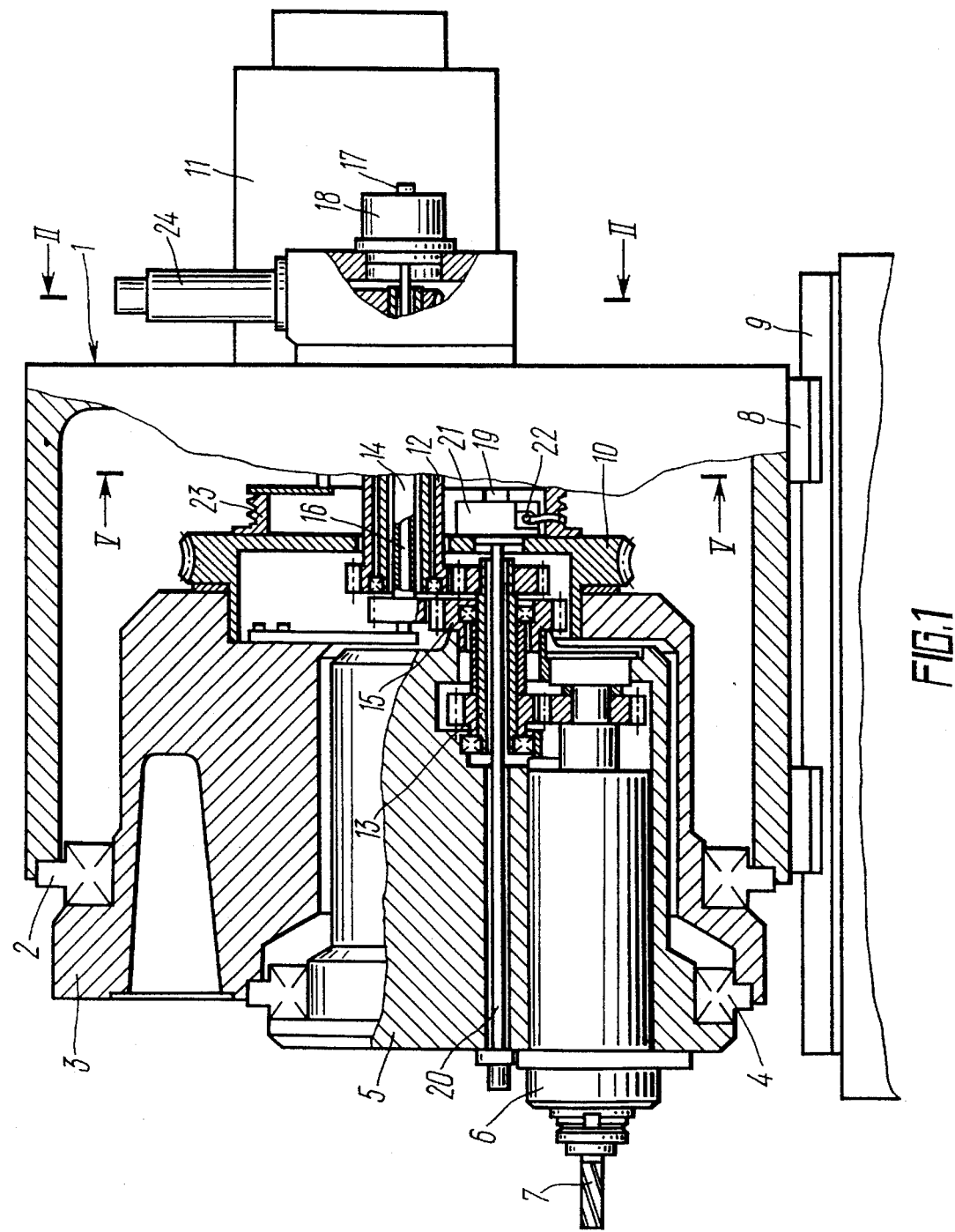
FIG. 1 is a general view of the spindle head of a metal-working machine-tool, made according to the invention.

A spindle head of a metal-working machine-tool comprises a housing 1 (FIG. 1) internally accommodating a faceplate 3 installed for rotation on a circular slideway 2 and said faceplate 3 internally accommodates a spindle quill 5 installed eccentric to the axis of rotation thereof on a circular slideway 4 and provided with an eccentrically installed spindle 6 with a tool 7, the value of eccentricity in the arrangement of the faceplate 3 and the spindle quill 5 being equal to the value of eccentricity in the arrangement of the spindle 6.

The spindle head is provided with linear slideway blocks 8 movable on slideways 9 in the direction parallel to the axis of the spindle 6. The faceplate 3 carries a worm wheel 10 of a drive for its rotation (not shown on the drawing).

A motor 11 of the drive for rotating the tool 7 is installed on the housing 1 and is connected with the spindle 6 through a hollow double-gear cluster 12 and a hollow countershaft 13 arranged in the spindle quill 5 concentric to its axis of rotation. A space of the double-gear cluster 12 accommodates a hollow driving shaft 14 of the turning mechanism of the spindle quill 5 which is meshed with a cluster gear 15 secured on the spindle quill 5. The driving shaft 14 internally accommodates a rod 16 connected by one end thereof with the faceplate 3 and by the other end, with a rotor 17 of the faceplate angular position transmitter a stator 18 of which is secured on the housing 1.

Figure 2:
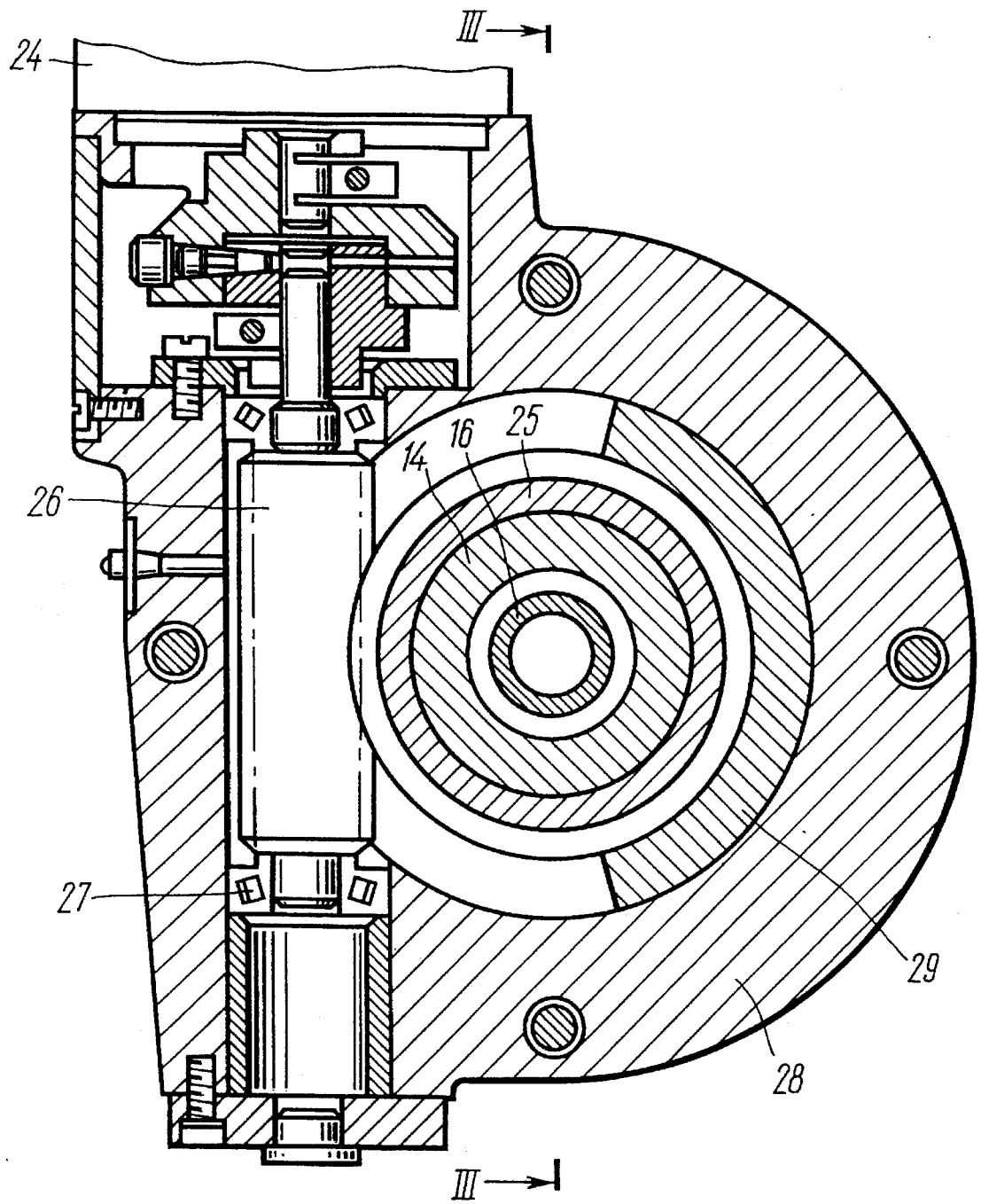
FIG. 2 is a section taken along the line II—II of FIG. 1.

The rotor 19 of the angular position transmitter of the spindle quill 5 is connected through the medium of a rod 20 arranged inside the countershaft 13 with the spindle quill 5, while a stator 21 with a supply cable 22 is rigidly associated with the faceplate 3. A reel 23 with helical flutes on its external surface is secured on the faceplate 3. A driving motor 24 imparts rotation to a worm wheel 25 (FIG. 2) through a worm 26 installed on supports 27 in a housing portion 28 adapted for displacement in a plane perpendicular to the axis of the driving shaft 14 toward the axis of the worm 26 and at right angles thereto.

Figure 3:
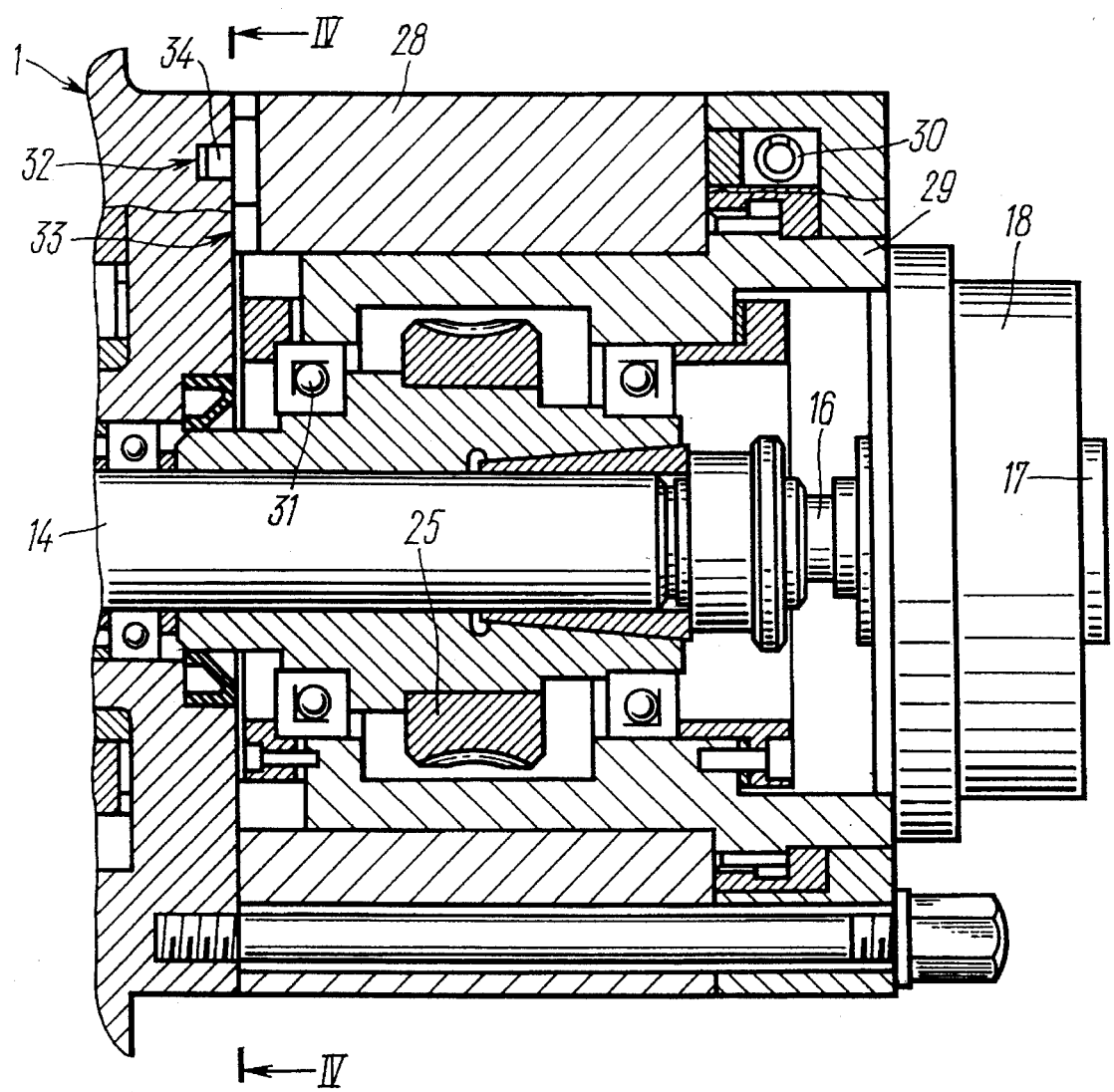
FIG. 3 is a section taken along the line III—III of FIG. 2.
Figure 4:
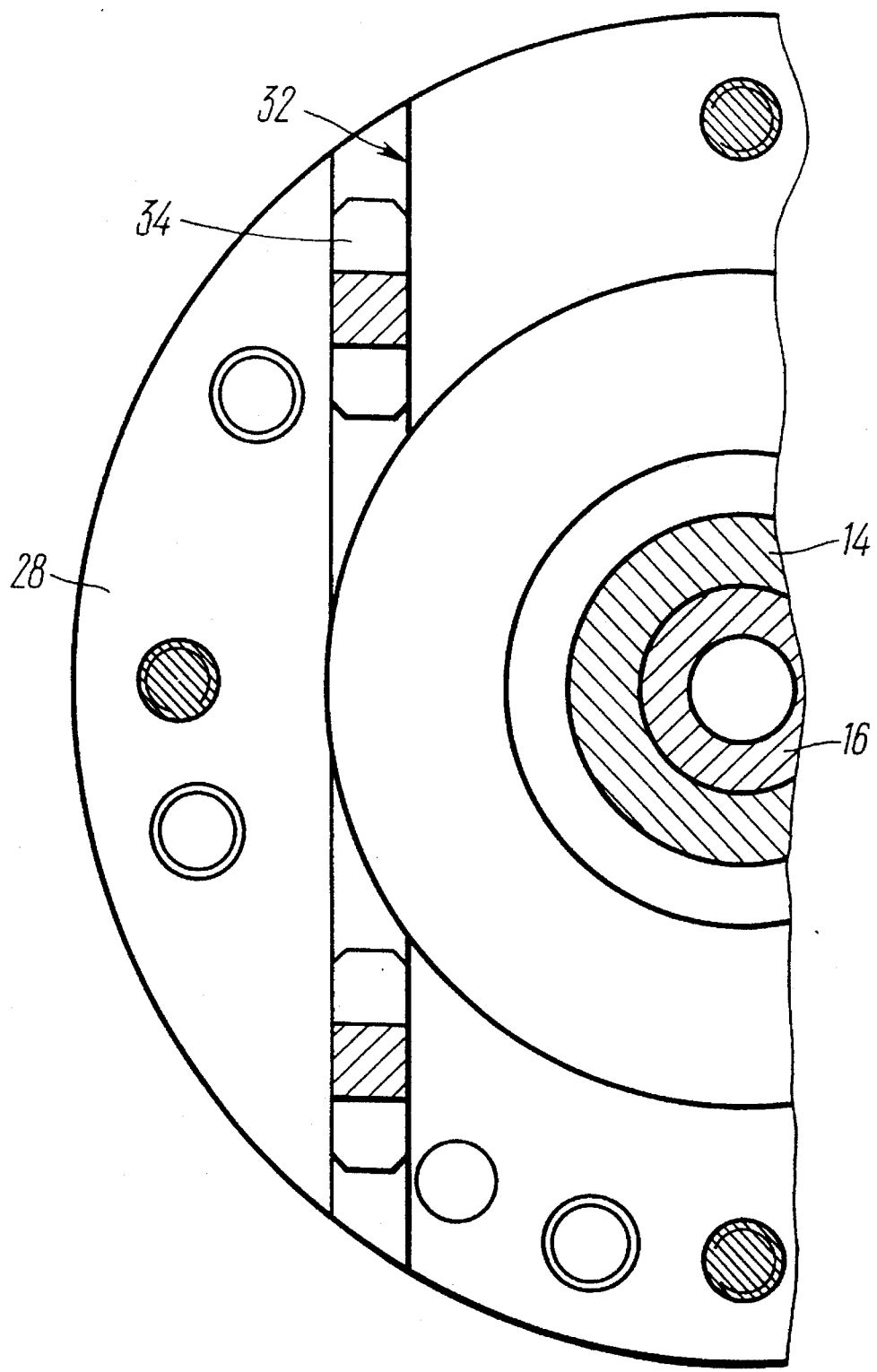
FIG. 4 is a section taken along the line IV—IV of FIG. 3.

A sleeve 29 (FIGS. 3, 4) preloaded by springs 30 is installed in the portion 28 of the housing 1 for rotation in relation to said portion 28. The sleeve 29 is connected with the worm wheel 25 by means of antifriction supports 31, and the axis of rotation of the sleeve 29 is offset in relation to the axis of the worm wheel 25. The spindle head housing 1 and its portion 28 are provided with mutually perpendicular slots 32 and 33 which receive cross-shaped keys 34.

The supply cable 22 (FIG. 1) of the angular position transmitter of the spindle quill 5 is laid on the reel 23 secured on the faceplate 3 and on a stationary reel 35 (FIGS. 5, 6) provided with flutes directed opposite to the direction of the flutes cut on the drum 23. The reel 35 is provided with a tension pulley 36 secured on a carrier 37 of a planetary transmission 38 mounted inside the stationary reel 35 and connected with the faceplate 3 by means of a driving pin 39. The carrier 37 of the planetary transmission 38 mounts a bar 40 with axially movable runners 41 provided with guide pins 42 and the stationary reel 35 has slots 43 (FIG. 6) which accommodate limit switches 44 cooperating with the runners 41, and the tension pulley 36 is spring-loaded relative to the carrier 37.

The proposed spindle head operates in the following way. The spindle head housing 1 (FIG. 1) is moved together with the slideway blocks 8 on the slideways 9 and the spindle 6 with the tool 7 is fed along the axis thereof. The feed in plane perpendicular to the axis of the tool 7 is accomplished by a correlated turning of the faceplate 3 and the spindle quill 5 about respective axes.

The spindle 6 with the tool 7 can be set at any point within the limits of a circle with a radius equal to a doubled eccentricity of arrangement of the axes of the faceplate 3 and the spindle quill 5 by turning the faceplate 3 and the spindle quill 5 through respective angles corresponding to the preset point. Motion of the spindle 6 with the tool 7 along any preset path is presented as the sequential passing through a multitude of preset points. Thus, the control of motion in the plane perpendicular to the axis of the tool 7 is accomplished in a special system of coordinates. Conversion from the traditional system of coordinates (orthogonal or polar) and vice versa is accomplished in a real-time operation mode by the control system of the machine-tool wherein the given spindle head is used. The faceplate 3 is rotated on the circular slideways 2 by means of the worm wheel 10. Position of the faceplate 3 is followed up by the transmitter the rotor 17 of which is turned by the rod 16 moving as a unit with said faceplate 3, and the position of the transmitter rotor 17 and its readings are in absolutely precise compliance with real angular position of the faceplate 3 in relation to the spindle head housing 1.

The spindle quill 5 is turned on the circular slideway 4 by the cluster gear 15 driven through the shaft 14 by the worm wheel 25 (.FIG. 2) when the worm 26 is rotated by the driving motor 24. Position of the spindle quill is followed up by the transmitter the rotor 19 of which is turned by the rod 20 moving as a unit with the spindle quill 5, and the position of the transmitter rotor 19 and its readings are in absolutely precise compliance with the real angular position of the spindle quill 5 in relation to the faceplate 3. The backlash in meshing of the worm 26 with the worm wheel 25 is adjusted automatically: if in the process of operation the backlash increases due to wear or effect of the temperature, then the sleeve 29 is turned relative to the portion 28 of the housing 1 by means of springs 30. Due to the fact that the axis of the worm wheel 25 is offset relative to the axis of rotation of the sleeve 29 the portion 28 of the housing 1 is displaced complete with the worm 26, supports 27 and the motor 24 in the plane perpendicular to the axis of the worm wheel 25. Due to the interaction of the cross-shaped keys 34 with the slots 32 and 33, the portion 28 of the housing 1 is not turned relative to the axis of the worm wheel 25 but is only displaced in the direction of the axis of the worm 26 and at right angles thereto. The lateral displacement of the worm 26 in relation to its axis takes up the appeared backlash to the minimal value envisaged by the precision in manufacture of the transmission parts and by the adjustment of the force of the springs 30. The minimal backlash in the worm transmission mazes it possible to obtain a satisfactory dynamic characteristic of the automatic control follow-up drive well matching with the least increment of the angular position transmitter of the spindle quill 5.

Figure 5:
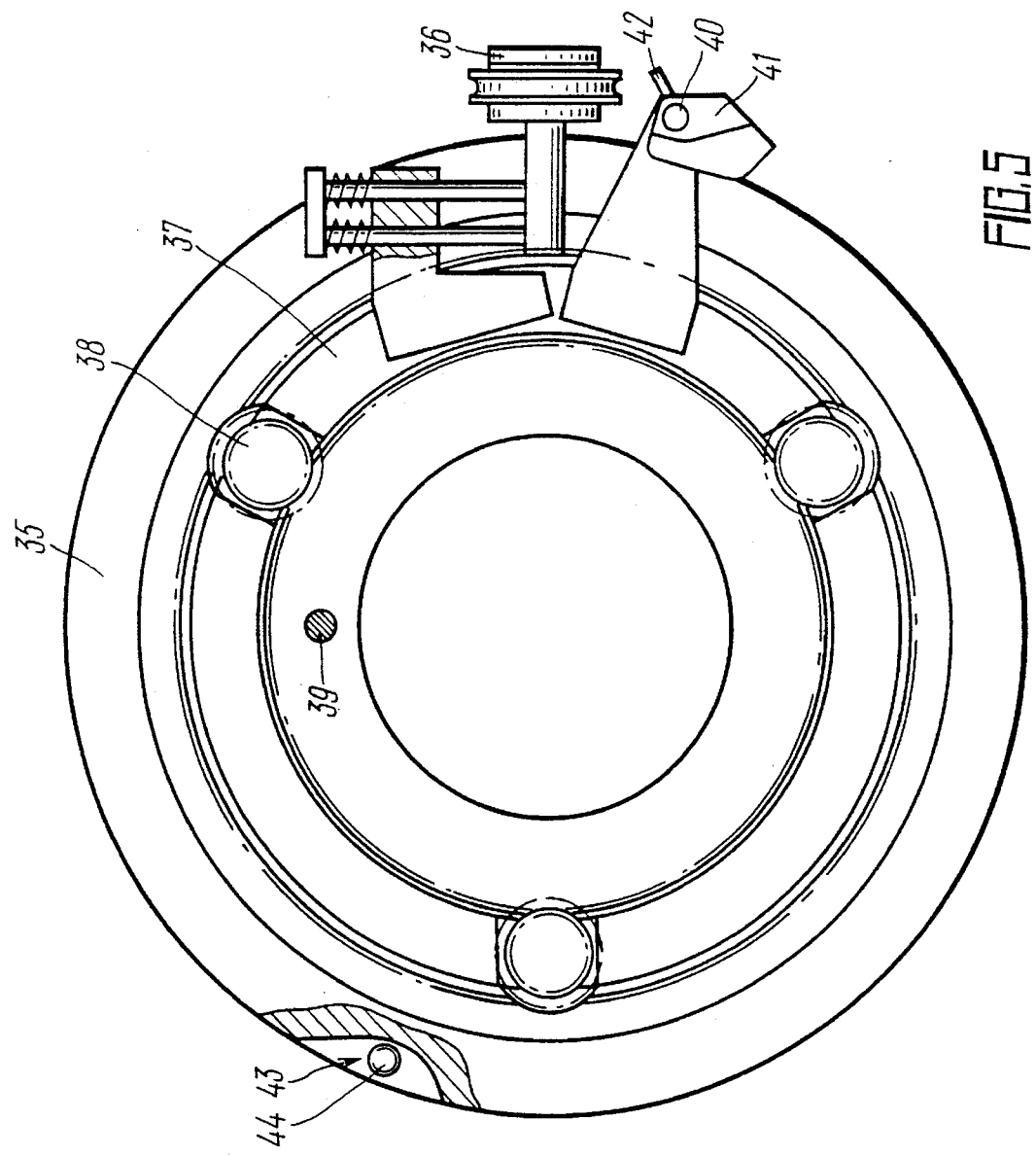
FIG. 5 is a section taken along the line V—V of FIG. 1.

The spindle 6 (FIG. 1) with the tool 7 is rotated at a cutting speed by the motor 11 through the hollow double-gear cluster 12 and the countershaft 39 (FIG. 5).

When the faceplate 3 is rotated the driving pin 39 (FIG. 5) actuates the planetary transmission 38 the carrier 37 of which is rotated together with the tension pulley 36 relative to the axis to the faceplate 3 in the same direction but at half the revolving speed of the faceplate 3. And the cable 22 (FIG. 1) is paid out of one of the reels 23 (FIG. 6) or 35 (depending upon the sense of rotation) and is wound up on the other one. The cable 22 is laid in the flutes of the reels 23 and 35 by means of the guide pins 42 when the runners 41 are moving on the bar 40.

Figure 6:
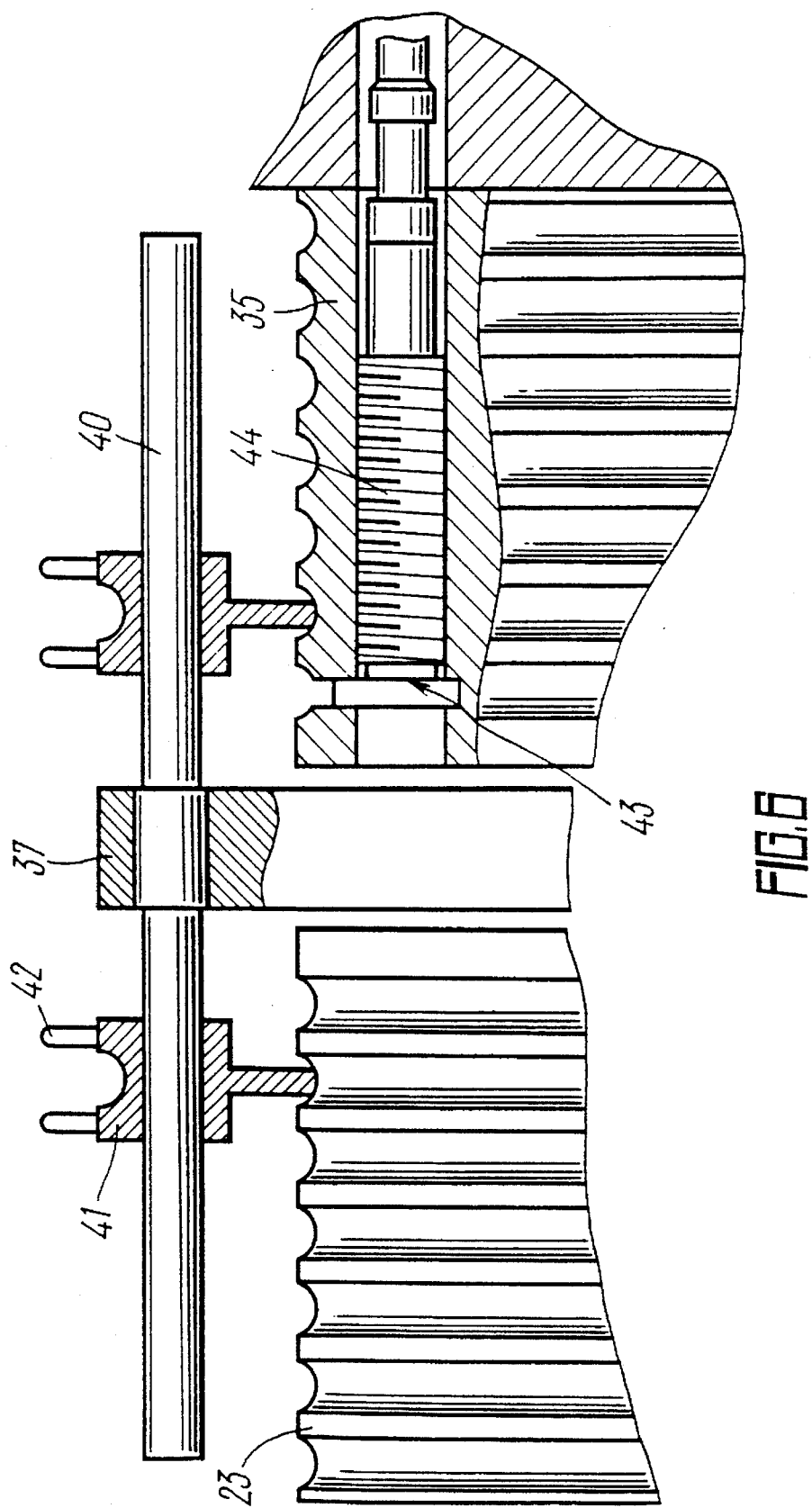
FIG. 6 illustrates a bar with guide runners.

Such a design makes it possible to turn the faceplate 3 (FIG. 1) through angles exceeding 360°, for example, through a few revolutions which is necessary for obtaining satisfactory technological characteristics of the spindle head and for ensuring the convenience in programming the machining. The full angle of the faceplate turning is limited by the number of turns of the helical flutes on the drums 23 and 35 (FIG. 6). At the same time the connection of the angular position transmitter of the spindle quill 5 with the control system is ensured with the aid of the cable 22 (FIG. 1) without intermediate plug connectors and current slip rings which excludes any possibility of the transmitter signal distortion and improves reliability of the spindle head operation and stability of positioning accuracy.

In case of an abnormally large angle of turn of the faceplate 3 one of the runners 41 (FIG. 6) gets in the slot 43 and the limit switch 44 shapes an emergency signal.

Advantages of the spindle design described hereinbefore reside in a possibility of reaching a high accuracy of positioning limited only by the precision in manufacture of the spindle head base parts, as well as by the least programmable increment of the used angular position transmitter and the control system, by achieving a high accuracy in machining curvilinear contours at the expense of approximating the curves not by the chords as in the existing systems but by the arcs of circles, by improved operational reliability and stability of positioning accuracy.

Industrial Applicability

A spindle head of the design described hereinbefore makes it possible to use it as a base for constructing numerical control-aided metal-working machines of type, or example, machining centers, flexible automatic lines with a stepping transfer system, etc. characterized by highly optimal mass and dimensions, increased accuracy and improved reliability.

We claim:

1. A spindle head of a metal-working machine, comprising:

a housing;

a first circular slideway accommodated in said housing;

a faceplate and an axis of rotation of said faceplate that is mounted in said first circular slideway rotatably round said axis of rotation thereof;

a second circular slideway arranged in said faceplate;

a spindle quill mounted rotatably in said second circular slideway eccentrically with respect to said axis of rotation of said faceplate;

a spindle eccentrically mounted in said spindle quill;

a rotation drive of said spindle;

a turning mechanism of said faceplate mechanically associated therewith;

a turning mechanism of said spindle quill mechanically associated therewith;

a transmitter of angular position of said faceplate;

a stator of said transmitter of angular position of said faceplate, held in place on said housing;

a rotor of said transmitter of angular position of said faceplate, adapted to interact with said stator of said transmitter of angular position of said faceplate;

a transmitter of angular position of said spindle quill;

a stator of said transmitter of angular position of said spindle quill, mounted on said faceplate;

a rotor of said transmitter of angular position of said spindle quill, adapted to interact with said stator of said transmitter of angular position of said spindle quill;

a hollow double-gear cluster kinematically associating said spindle with said rotation drive thereof;

a hollow drive shaft of said turning mechanism of said spindle, accommodated inside said hollow double-gear cluster;

a first rod accommodated inside said drive shaft, a first end of said first rod connected to said faceplate and a second end of said first rod connected to said rotor of said transmitter of angular position of said faceplate;

a hollow layshaft kinematically associated with said spindle and said double-gear cluster;

a second rod, a first end of said second rod connected to said spindle quill, a second end of said second rod connected to said rotor of said transmitter of angular position of said spindle quill;

a transfer device; and a cable, a first end of said cable held in place on said stator of said transmitter of angular position of said spindle quill, a second end of said cable adapted for interconnecting said stators of said transmitters of angular position of said faceplate and said spindle quill with the control system of the metal-working machine through said transfer device.

2. A spindle head of a metal-working machine according to claim 1, comprising:

a first portion of said housing;

a second portion of said housing;

mutually square slots provided in said first and second portions of said housing;

cross keys fitted in said mutually square slots to join together said first and second portions of said housing;

said faceplate accommodated in said first portion of said housing;

said turning mechanism of said spindle quill accommodated in said second portion of said housing;

a worm wheel set on said drive shaft of said turning mechanism of said spindle quill and accommodated in said second portion of said housing;

an axis of said worm wheel;

a worm engageable with said worm wheel; and a sleeve of said turning mechanism of said spindle quill, an axis of said sleeve that encompasses said worm wheel, has said axis thereof offset with respect to said axis of said worm wheel, and is turnable around the latter.

3. A spindle head of a metal-working machine according to claim 1, wherein said transfer device is essentially a mechanism for rewinding said cable, comprising:

a first and a second reel of said mechanism for rewinding said cable, said reels being coaxial with respect to each other and having opposite-hand screw threads;

said first reel held in place on said faceplate;

said second hollow reel fixed stationary in said housing; slots made in said second reel;

an epicyclic gear train of said mechanism for rewinding said cable, accommodated in said second reel;

a planet pinion carrier of said epicyclic gear train;

a bar installed on said planet pinion carrier;

reciprocating runners mounted on said bar; and limit switches fitted in said slots of said second reel so as to interact with said reciprocating runners.

\* \* \* \* \*